Aug. 8, 1950     L. H. PLATT ET AL     2,517,710
WIRE BOUND BOX LIDDER

Filed June 5, 1947     9 Sheets-Sheet 1

LELAND H. PLATT,
LELAND H. PLATT JR.
and JOHN D. PLATT
INVENTORS

BY Hadwin White
ATTORNEY

Aug. 8, 1950 L. H. PLATT ET AL 2,517,710
WIRE BOUND BOX LIDDER
Filed June 5, 1947 9 Sheets-Sheet 6

LELAND H. PLATT,
LELAND H. PLATT JR.
and JOHN D. PLATT
INVENTORS

BY
ATTORNEY

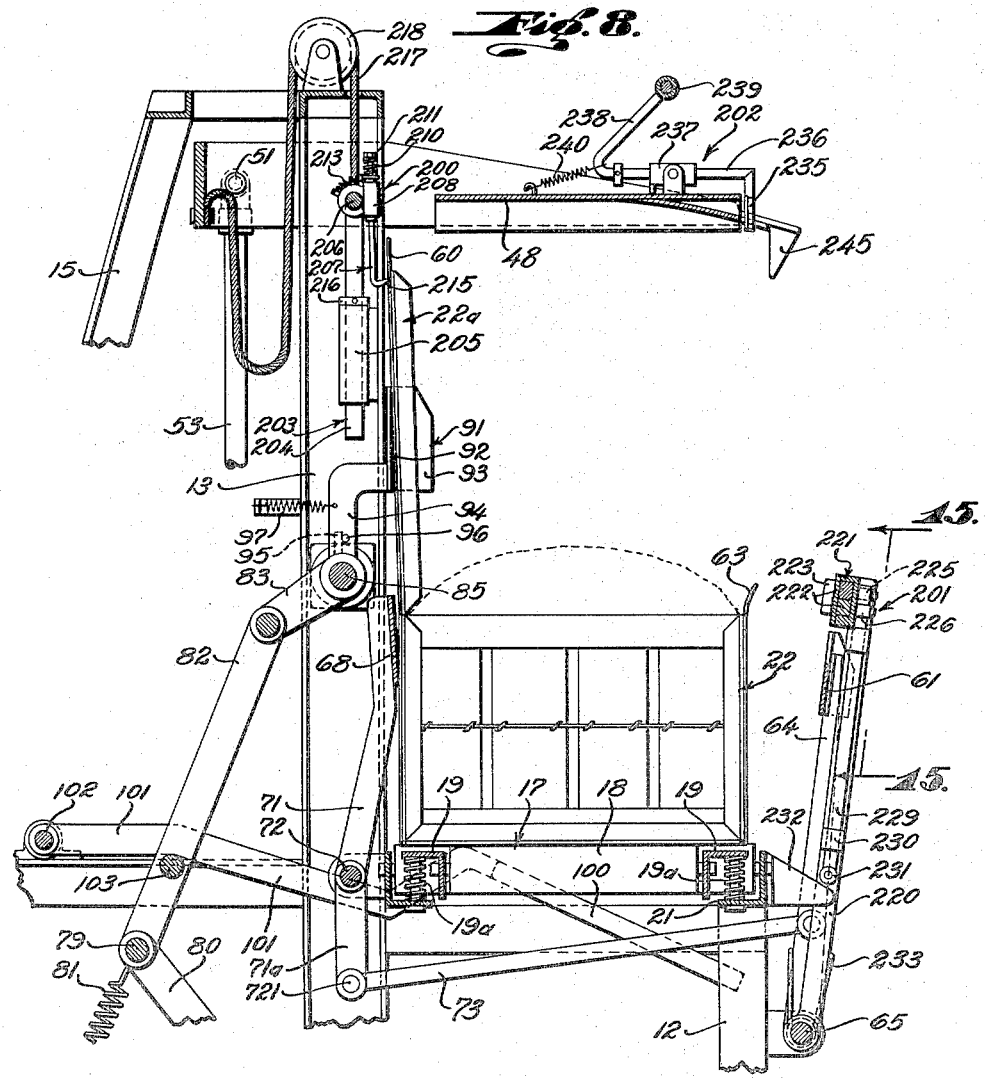

Aug. 8, 1950     L. H. PLATT ET AL     2,517,710
WIRE BOUND BOX LIDDER
Filed June 5, 1947     9 Sheets-Sheet 8
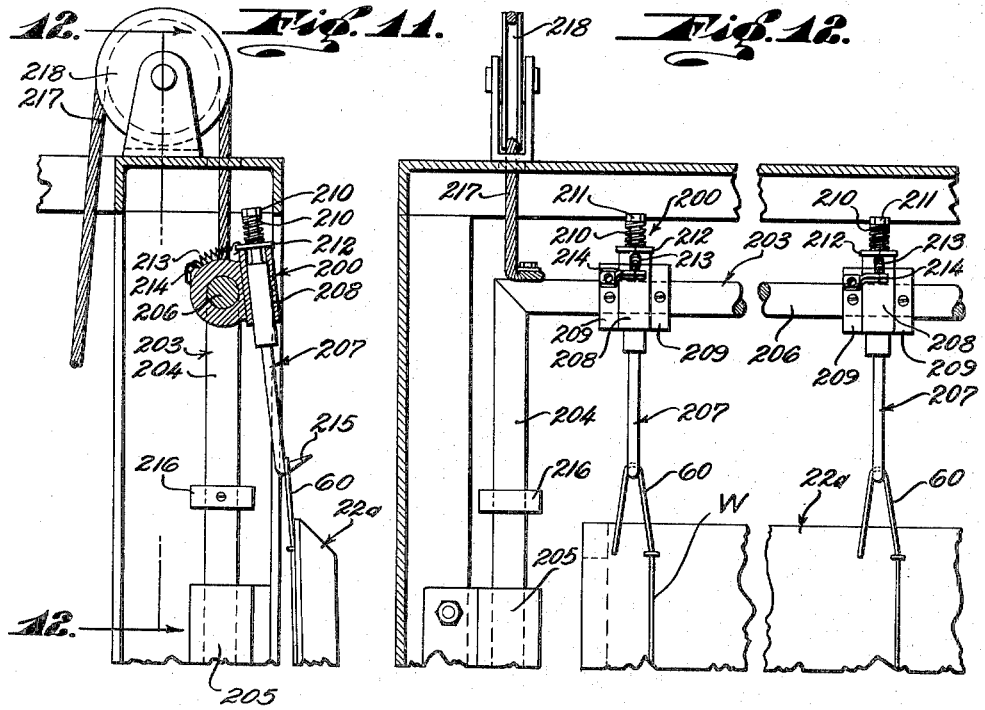
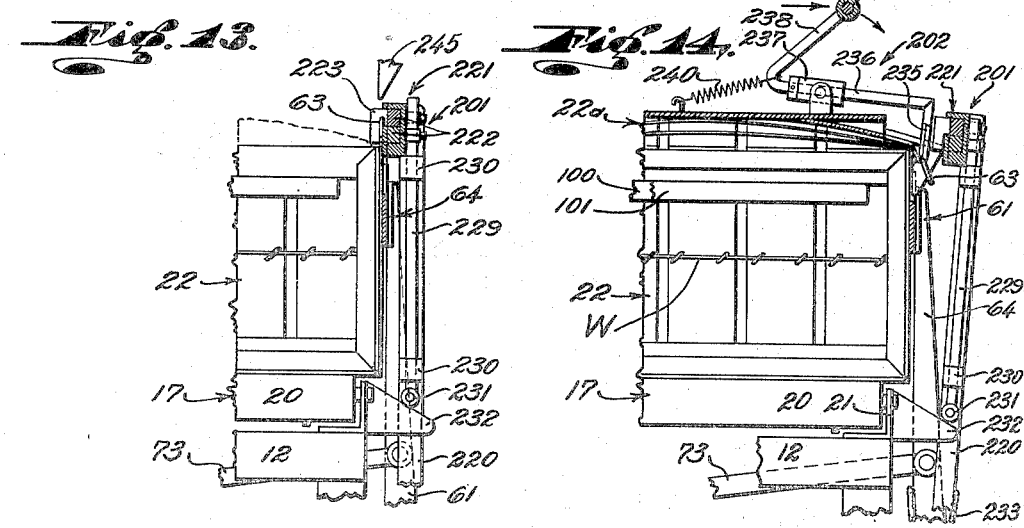
Leland H. Platt,
Leland H. Platt Jr.
and John D. Platt
INVENTORS
ATTORNEY Aug. 8, 1950     L. H. PLATT ET AL     2,517,710
WIRE BOUND BOX LIDDER.
Filed June 5, 1947     9 Sheets-Sheet 9
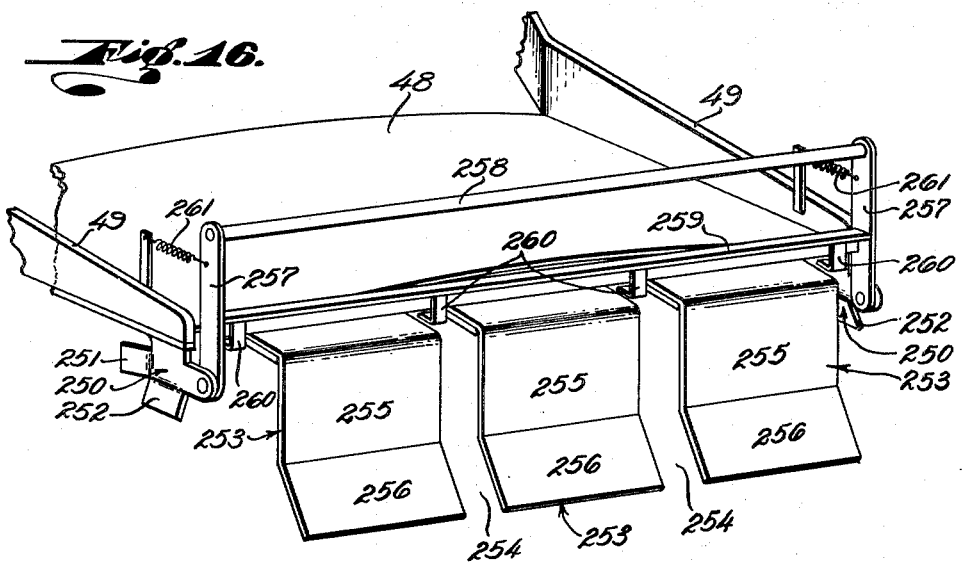
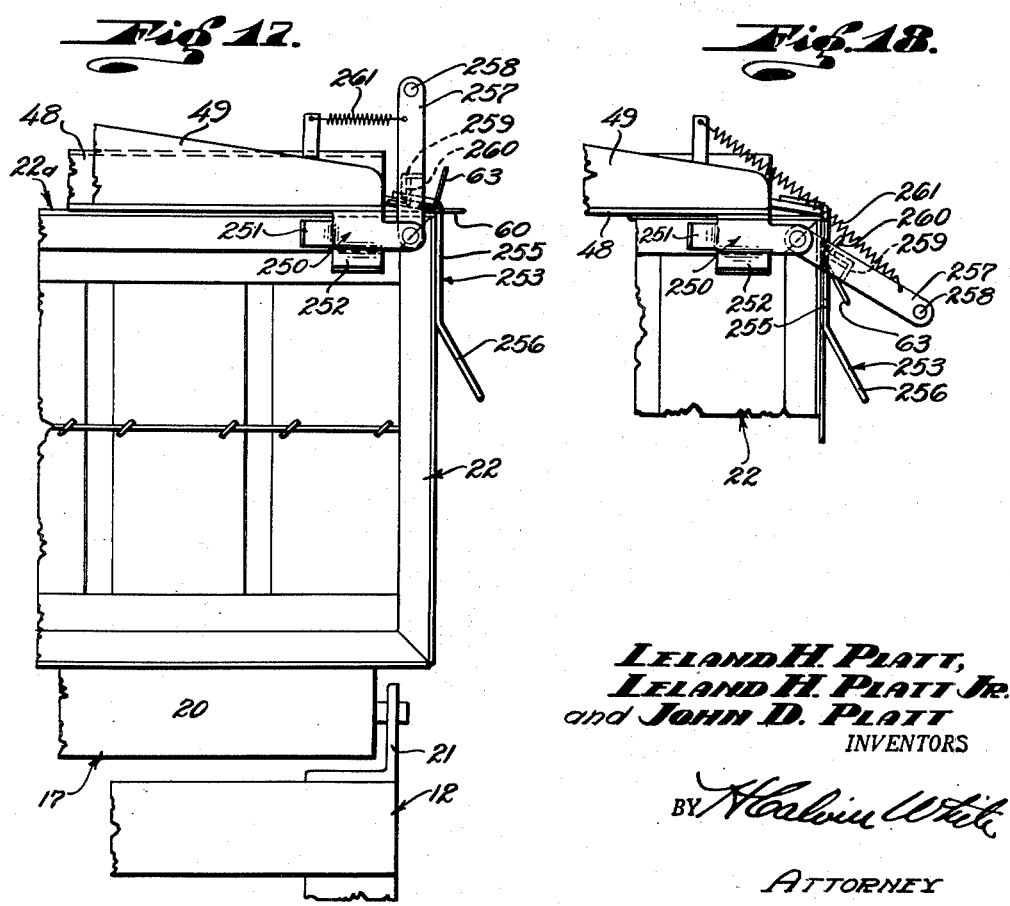
LELAND H. PLATT,
LELAND H. PLATT JR.
and JOHN D. PLATT
INVENTORS
BY H. Calvin White
ATTORNEY Patented Aug. 8, 1950

2,517,710

UNITED STATES PATENT OFFICE 2,517,710

WIRE-BOUND BOX LIDDER

Leland H. Platt, Leland H. Platt, Jr., and John D. Platt, Los Angeles, Calif.

Application June 5, 1947, Serial No. 752,854

34 Claims. (Cl. 100—57)

This invention has to do with machines for pressing lids on produce crates or boxes, for example boxes containing crown packed vegetable produce such as celery and lettuce, and is concerned particularly with improvements in this type of machine applicable especially to the lidding of boxes subject to bulging as pressure is applied to their contents, of which wire bound crown packed boxes are typical.

Such boxes, now coming into increasing use because of their various advantages, present a number of particular problems because of their structural characteristics and tendency toward deformation when placed under pressure in a lidding operation. This type of box is adaptable for manufacture and shipment to places of use, in a flat collapsed condition by reason of the box being made of thin wooden bottom, side and cover sections strengthened by cleats and rails, and further reenforced by wires providing flexible interconnections between the sections permitting them to be assembled in box formation. Being advantageously light weight and resistant to breakage, the boxes are flexible and subject to bulging by pressure applied to the crown pack as the contents are compacted in applying the cover on the box.

One of our major objects is to provide for side support of the box during the lidding operation, in a manner preventing its distortion and assuring proper engaging or interlocking relation between the box and its cover as the latter is pressed down over the crown pack. Such support is given the box by relatively movable members in the nature of pressure plates extending along opposite sides of the box and operated to engage and disengage the box in relation to the application of pressure to its contents. Preferably, as will appear, provision is made for so supporting all four sides of the box by laterally movable pressure members operating in predetermined timed relation with relative vertical movement of the box support and cover press head.

A further object is to support and control the application to the box of its attached cover, in a manner assuring confinement and placement of the cover in accurately alined relation with the box top. One important feature in this respect is the support given the cover at its hinge, whereby the cover is held against displacement transversely of the hinge and is maintained in correspondingly alined relation to the box. The cover position and movement are further controlled by a holder mechanism acting to receive and stabilize the cover longitudinally of the hinge, and to swing it downwardly, while thus stabilized, toward the box in advance of complete cover-applying relative movement of the support and head.

The invention further contemplates a novel operating sequence in compressing the produce into the box, and applying the lid over the crown pack, which may be employed in some, though not necessarily all adaptations of the invention. As will appear, the machine may be used to perform a two stage or cycle operation whereby the head first is caused to compact the produce into the box before application of the cover and preferably with the box sides laterally unsupported, the capacity of the flexible sides for bulging permitting the produce to be compacted without injury, and allowing some of the overfill to be brought down into the box. During the second operating cycle, the cover is pressed onto the box (with its sides supported) and against the previously compacted produce, the condition of which, by reason of the precompression, allows the cover to be pressed to fully closed position with greater ease and less injury to the produce.

At this point it may be observed that in certain of its broad aspects, the invention contemplates the use of any of the generally used types of mechanical actions for producing relative movement of the box support and cover press head to apply the cover to the box. Typically, we may employ a stationary support and an overlying vertically movable press head.

Further objects of the invention have to do with the provision of mechanisms for straightening the box-carried or cover-carried flexible projections, or both, to effect their alinement for interconnection when the cover is pressed on the box, and if desired, for completing the operation by interlocking the projections, specifically, the invention provides mechanisms operable in timed relation with the parts of the lidding machine to straighten looped projections on the cover and box so that one may enter the other, and a further device for forming the interlock.

The invention has various additional features and objects, all of which will be apparent without necessity for further preliminary discussion, from the following detailed description of an illustrative embodiment shown by the accompanying drawings, in which:

Fig. 3 is a view taken on line 3—3 of Fig. 1 showing the positions of the parts at about the limit of the first down stroke of the head;

Figure 1:
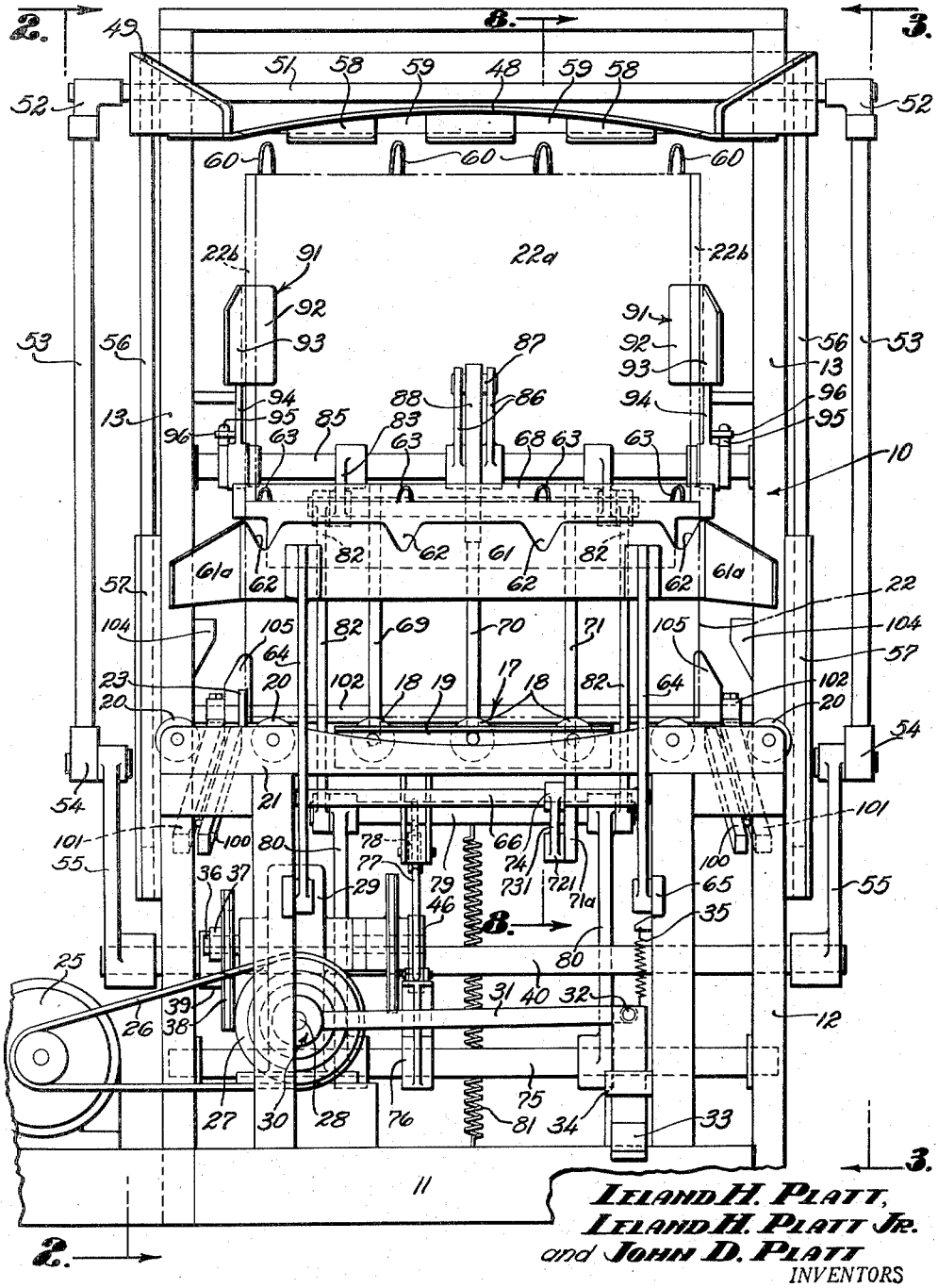
Fig. 1 is a view showing the machine in front elevation, with the parts positioned for reception of a box to be lidded.
Figure 4:
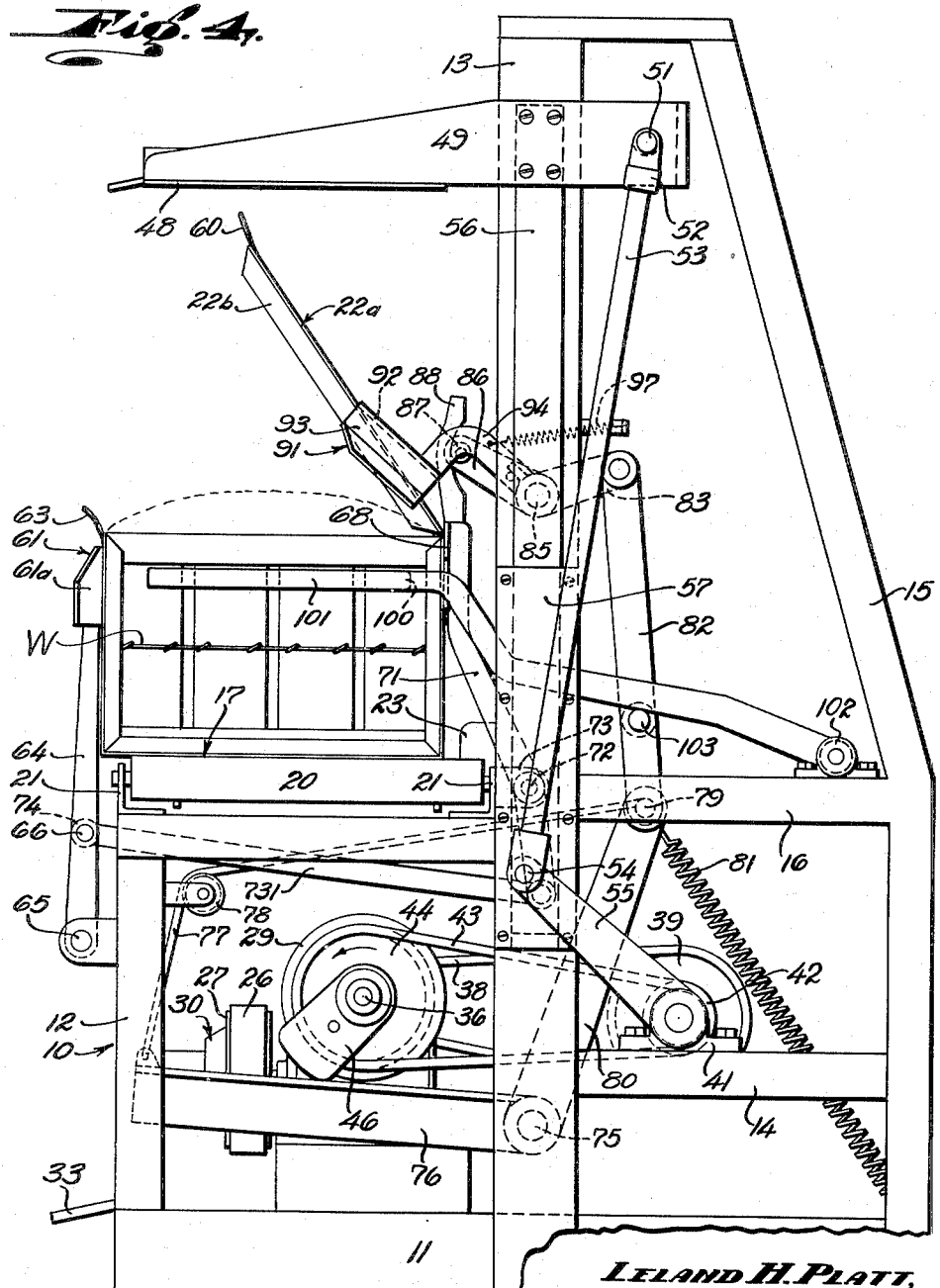
Figure 5:
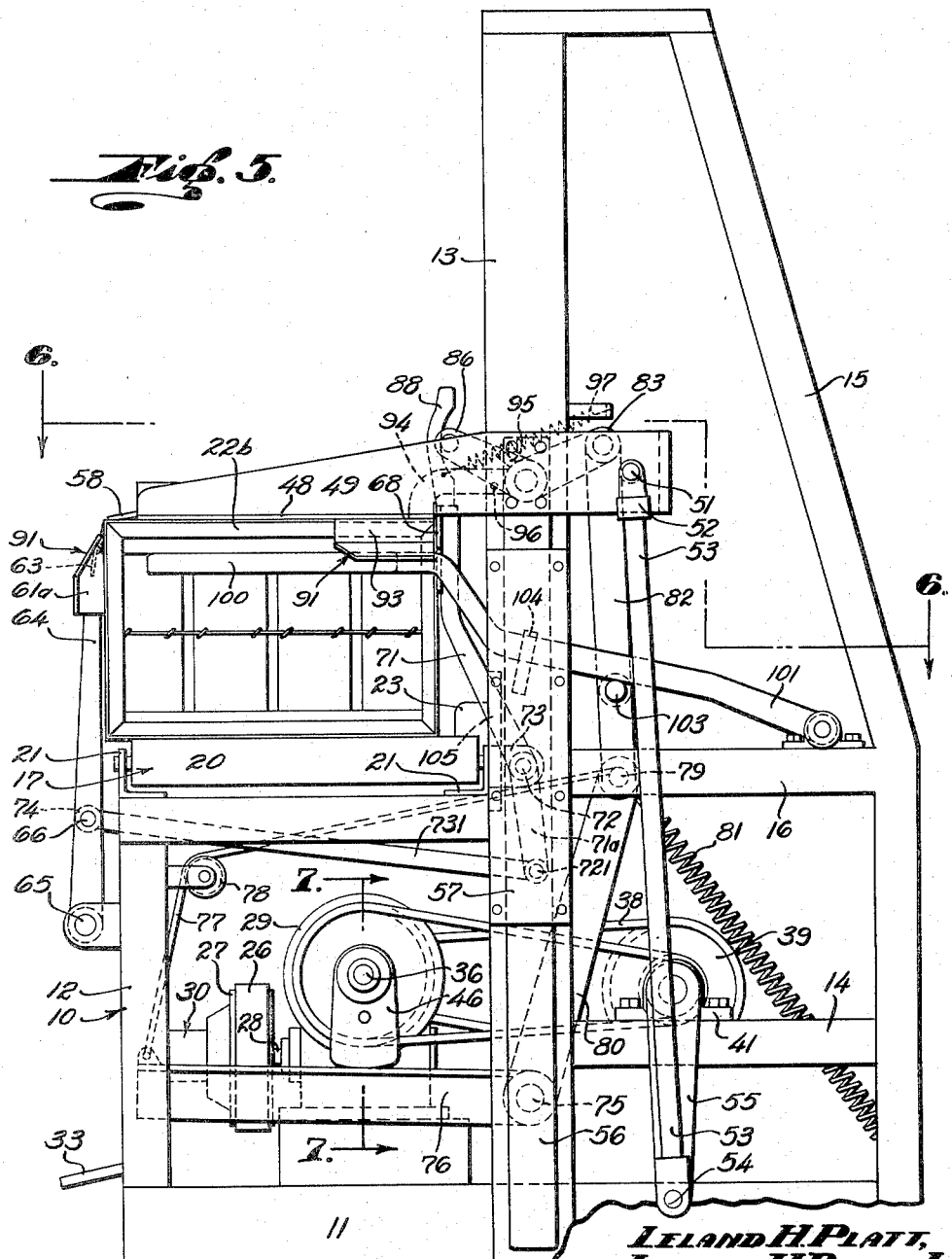
Figure 6:
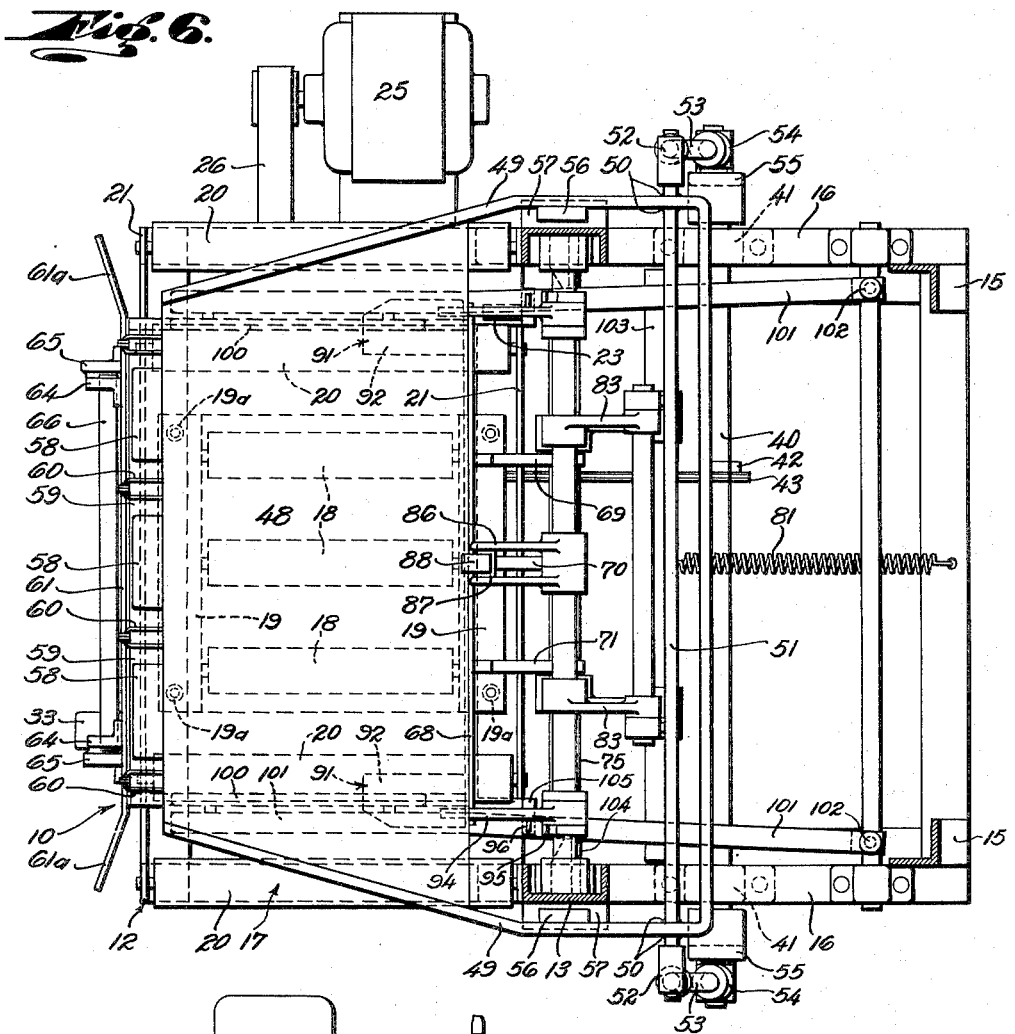
Figure 7:
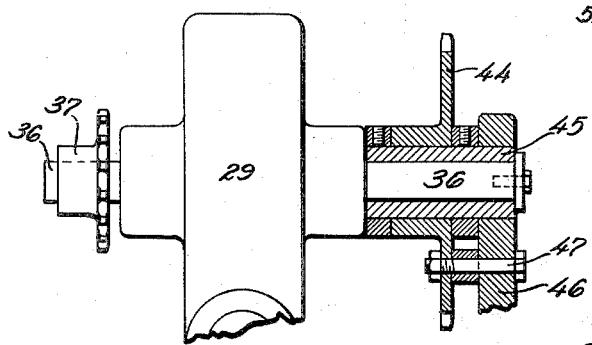

Fig. 4 is a similar view showing the head returned to up position and the box cover swung inwardly beneath the head;

Fig. 5 similarly shows the positions of the parts at the limit of the second down-stroke of the head;

Fig. 6 is a plan view on line 6—6 of Fig. 5;

Fig. 7 is a fragmentary view, partly in section, taken on line 7—7 of Fig. 5;

Fig. 8 is a supplementary showing of features not included in Figs. 1 to 7, inclusive, taken in the aspect of line 8—8 in Fig. 1;

Figs. 9 and 10 are fragmentary views illustrating the condition of the lid attaching loops before and after straightening;

Fig. 11 is an enlarged fragmentary vertical section of Fig. 8 illustrating the straightening of the lid tying loops;

Fig. 12 is a transverse vertical section taken on line 12—12 of Fig. 11;

Fig. 13 is a fragmentary section illustrating the front box clamping means and associated loop straightening means in their actuated position;

Fig. 14 is a view similar to Fig. 13 illustrating the wire straightening means retracted and the manually operated wire curling means for locking the lid;

Fig. 15 is a fragmentary front elevation taken on line 15—15 of Fig. 8;

Fig. 16 is a perspective view showing a variational feature of the invention;

Fig. 17 is a fragmentary end view showing the cover press assembly of Fig. 16 lowered to press the lid on the box; and Fig. 18 is a fragmentary view similar to Fig. 17 showing the parts in their wire projection interlocking position.

Generally speaking, the machine may have any suitable frame structure 10, here shown typically to comprise a base 11, a forward table structure 12, side columns 13, and a rear framework including members 14, 15 and 16. The table 12 carries a box supporting structure 17 comprising an inner series of rollers 18, the trunnions of which are journaled in an angle iron frame 19, and the relatively longer end rollers 20, the trunions of which are supported by the angles 21. Frame 19 and rollers 18 are yieldably supported on springs 19a carried by angles 21. As viewed in Fig. 1, the box, indicated by the broken lines 22, is movable from the right onto the support 17 and to a position of alinement with the latter described head structure, as determined by engagement of the box with a stop 23 projecting forwardly near column 13 at the left.

Figure 2:
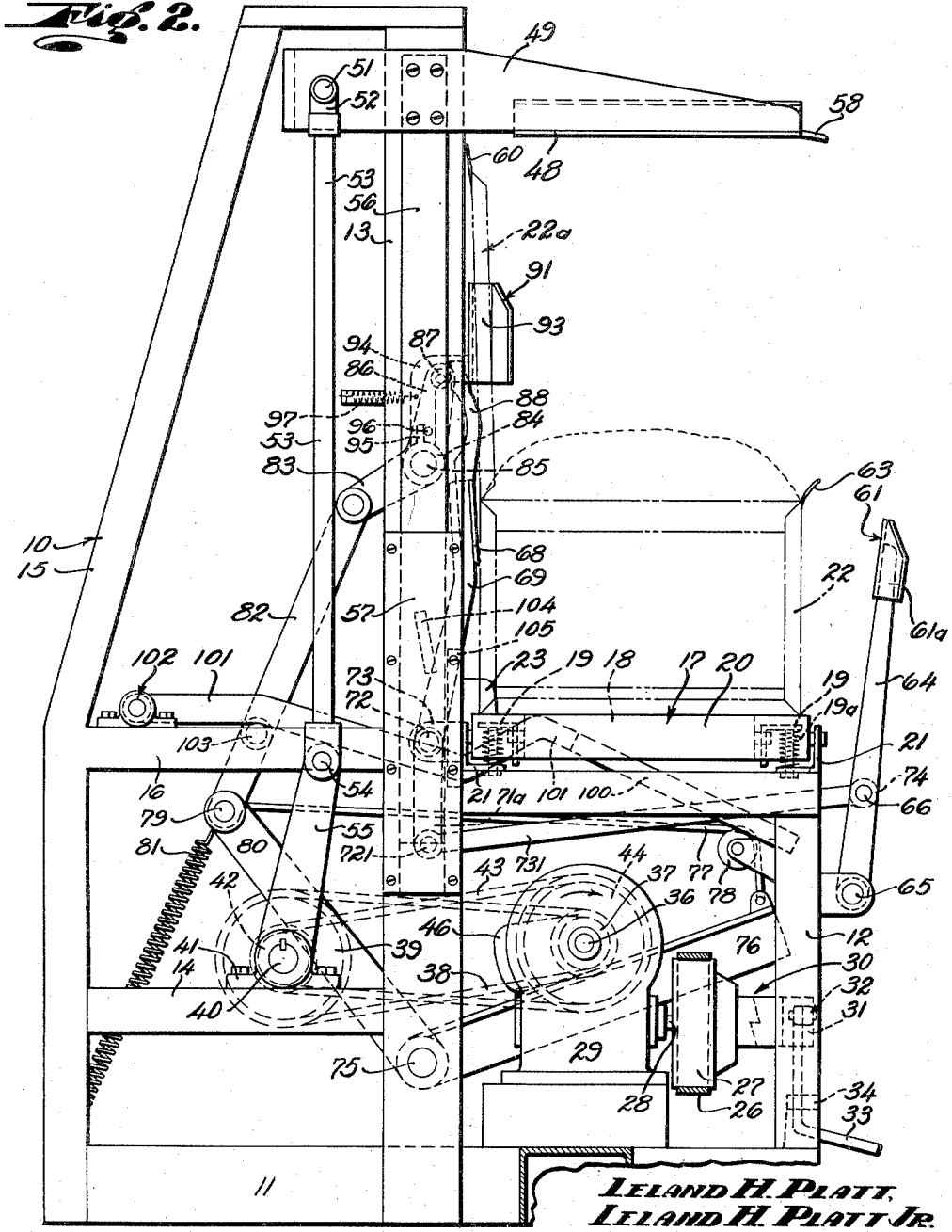
Fig. 2 is an end view taken on line 2—2 of Fig. 1.

Referring to Figs. 1 and 2, the machine is powered by a motor 25 driving through belt 26, a pulley 27 at times free running on the shaft 28 of a speed reducing transmission 29. The pulley 27 is brought into and out of driving relation with the transmission shaft by the conventionally illustrated clutch 30, which may be of any suitable type, operated by arm 31 pivotally connected at 32 with the foot pedal 33 confined in its vertical movement within bracket or guide 34. Spring 35 normally maintains the control arm 31 in raised position to disengage the clutch 30. When the operator steps on the pedal 33, the drive is transmitted through shaft 28 and through the transmission 29 to its output shaft 36. The latter carries a sprocket 37 from which the drive is transmitted by chain 38 to sprocket 39, its keyed shaft 40 journaled within bearings 41 on the frame member 14. Shaft 40 carries a second sprocket 42 driving through chain 43 a sprocket 44, see Fig. 7, carried by a sleeve 45 which may be free running on the shaft 36. By virtue of the described drive transmission from shaft 36 through the sprockets and chains to sprocket 44 and the sleeve 45, the rotative speed of this sprocket, or both the sprocket and sleeve, is one-half the rotative speed of shaft 40. Sleeve 45 carries a cam 46 secured to sprocket 44 by bolt 47, the cam having the stated speed relationship to shaft 40 and functioning as later described.

A cover press head in the form of an upwardly concave plate 48 overlies the support 17 and is carried by a U-shaped frame 49 welded or otherwise attached at 50 to a transverse rod 51 having pivotal connections at 52 with a pair of crank rods 53 connected at 54 with the crank arms 55 carried by shaft 40. The head frame 49 carries a pair of depending rods 56 extending within guides 57 to confine the head assembly for straight vertical reciprocating motion. Such motion is transmitted from shaft 40 through the crank arms 55 and rods 53 between the up position of Fig. 2 and the full down position appearing in Fig. 5. The forward edge of the head plate 48 may carry projections 58 spaced at 59 to accommodate the later described wire loops 60 carried by the box lid 22a.

A pressure plate 61 is positioned at the forward side of the box 22 for engagement with the side thereof, as and for the purposes later explained. Plate 61 is shown to be longitudinally co-extensive with the box and to have outwardly turned guide ends 61a, the plate being notched at 62 for accommodation of, or to permit access to wire loops 63 carried by the box for interlocking with the lid-carried loops 60, when the lid is pressed down onto the box. The pressure plate 61 is carried by a pair of arms 64 mounted at 65 on the frame table 12, the arms being interconnected by the horizontal rod 66, see Fig. 1. As illustrated, plate 61 is disposed toward the top portion of the box and has sufficient vertical extent to effectively resist bulging of the box side when engaged against it.

A second pressure plate 68 extending longitudinally opposite and above the inner side of the box 22, is carried by three upstanding arms 69, 70 and 71 integral with a shaft 72 supported in fixed bearings 73. Arm 71 has an extension 71a pivotally connected at 721 with a rod 731 attached at 74 to rod 66 interconnecting the outside pressure plate arms 64. Thus plates 61 and 68 are interconnected through their supporting arms and the described linkage, for simultaneous movement together and apart between the extreme positions appearing in Figs. 2 and 5. Operation of the pressure plates may be effected in any appropriate manner, as by the cam mechanism now to be described and operating in a predetermined time relation to the operating sequences of the machine.

Rotatable on a stationary shaft 75 extending between the columns 13, is an arm 76 underlying and engageable by the cam 46. A cable 77 extending over pulley 78 connects the forward end of arm 76 with a floating shaft 79 interconnecting the outer ends of a pair of arms 80 which oscillate on the shaft 75. Thus as arm 76 is swung vertically in response to its engagement by the cam 46, the arm movement is transmitted by cable 77 to arms 80 to produce their responsive movement which, in one direction, is resisted by coil spring 81. The floating shaft 79 is connected by links 82 with arms 83 fixed to rotatable shaft 85 supported by the columns 13. Shaft 85 carries a pair of arms 86 supporting a pin or roller 87 engageable with a cam 88 which may in effect be an extension of arm 70. Upon its rotation from the position of Fig. 2 to that of Fig. 5, cam 46 depresses the arm 76 causing, through cable 77, link 82 to rotate arms 83 and 86 to displace cam 88 against the resistance of spring 81 to the position of Fig. 5, whereupon the pressure plates 61 and 68 are brought simultaneously together and into supporting engagement with the sides of the box 22. By reason of the relative starting positions of the two pressure plates and the fact that they start to move simultaneously, plate 68, against which the box initially may be substantially engaged, displaces the box outwardly away from the stop 23 so that the box is then positioned to clear the stop 23 in its endwise movement from the support 17.

As the box is initially accommodated in the machine, its cover 22a is placed in an upstanding position to be received by and between a pair of angular holders 91, flanges 92 of which overlie the top surface of the cover while flanges 93 extend opposite and in substantial engagement with the edges of the cover to maintain the latter in centered relation to the box. Holders 91 are carried by arms 94 rotatable on and movable with the shaft 85 as the latter is actuated by the linkage 82 and 83 as above described. The shaft carries a pair of projections 95 engageable against pins 96 on arms 94, so that in one direction of the shaft rotation, the holders 91 are swung down against the resistance of springs 97 to bring the lid 22a into position underlying the head 48. As will later appear, the holders 91 are engaged and retained by the head during pressural application of the cover to the box, and while shaft 85 reversely rotates in response to the movement of the linkage 82 and 83.

Provision also is made for supporting the box ends against bulging as the lid is pressed in place, as by a pair of transverse members 100 carried by a pair of angular arms 101 having their rear ends pivotally attached at 102 to the frame members 16. As illustrated in Figs. 1 and 2, arms 101 normally extend forwardly between and below the top surfaces of the end of table rollers 20 out of the path of box 22 as it advances onto or from lidding position. The arm pivots at 102 are in the nature of universal joints permitting lateral as well as vertical swinging of the arms. The latter are actuated by engagement with a rod 103 carried by and extending between the links 82. Thus as link 82 raises, rod 103 elevates the arms 101 against a pair of angular stationary cams 104 carried by the frame, the effect of the cam engagement being to swing the arms, as they are raised, toward the box and thus bring the arm-carried members 100 into tight pressural engagement with the box ends, as in the positions of Figs. 4 and 5. Upon downward movement of links 82 and rod 103, arms 101 follow by gravity to be displaced outwardly to their starting positions by engagement with the stationary cams 105, see Fig. 1.

Before considering the operation of the machine, reference may be had to the structural characteristics of the box 22 and its cover 22a. This kind of box is known in the trade as a wirebound type and is made of rather thin, veneer-like wooden sides, bottom and ends with wires W interlaced throughout the box structure to render it particularly strong and resistant to breakage despite the light-weight and flexibility of the wood. The cover 22a is similarly thin and flexible and has wire re-enforcements including the previously described loops 60 which, when the cover is pressed down in place on the box, are interlocked with the wire loops 63 at the forward edge of the box. It is to be particularly noted that the cover carries a pair of downwardly projecting end cleats 22b which, when the cover is pressed onto the box as shown in Fig. 5, overlap the box ends at the outside thereof to thereafter hold the ends against expansion or bulging. The bottom edge of the cover has wire hinge connections with the box, permitting the cover to be raised as in Fig. 2 and thereafter press down on the box while secured thereto at the hinge.

Figure 3:
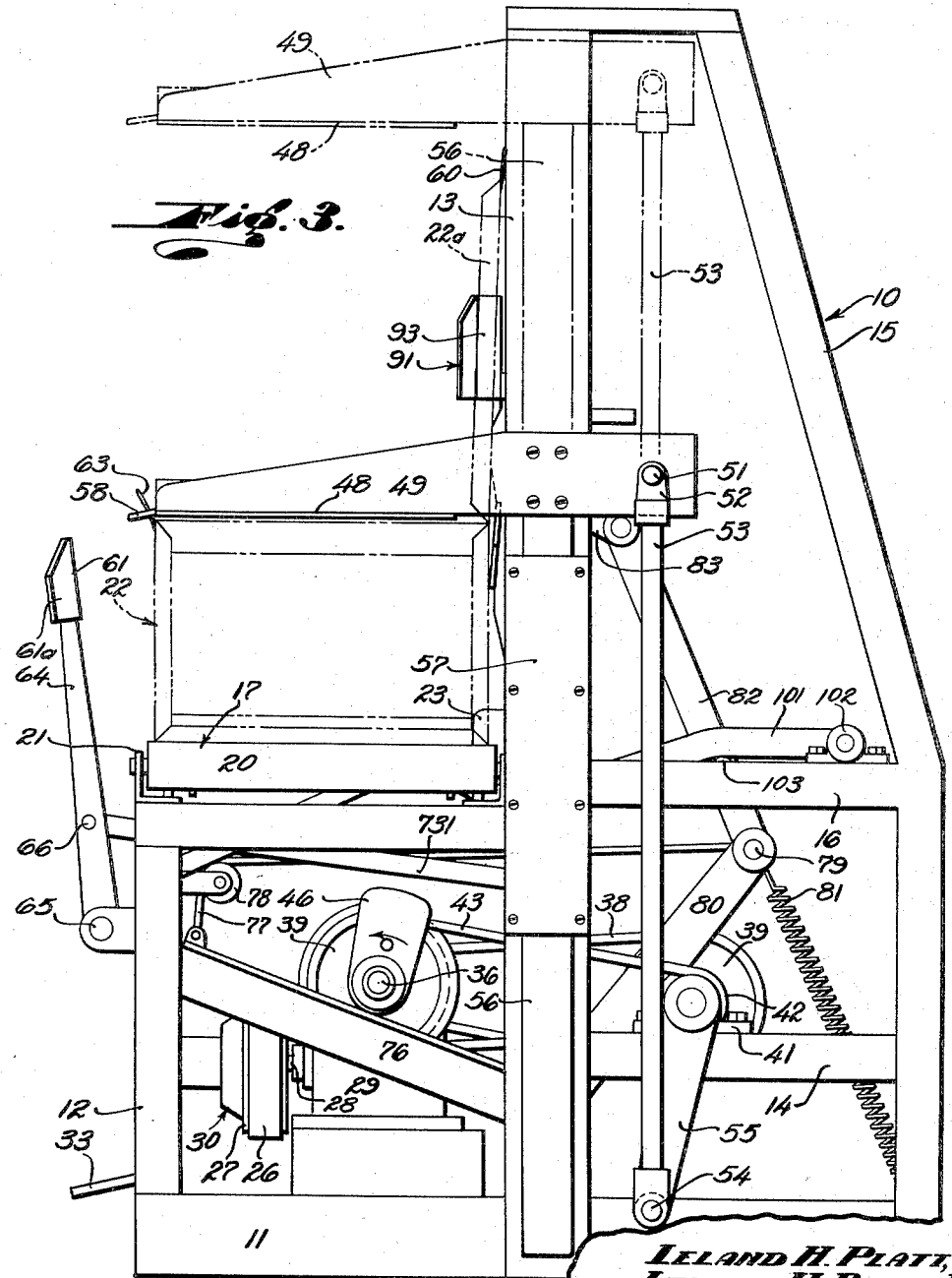

In a lidding operation, the crown packed box (i. e. a box containing produce filled considerably above the top of the box) is moved onto the support 17 from the right as viewed in Fig. 1, into engagement with the stop 23. The box cover 22a first is positioned between the holders 91 at a location inwardly offset from the head 48, so that the latter may descend without interference by the cover. Then upon depression of the foot pedal 33 to engage clutch 30, the drive transmitted to shaft 40 causes the head 48, through linkage 55 and 53, to be pressed down directly upon the crown of the produce, and thus compact the produce into the box. Reception or accommodation of the pressed produce in the box is facilitated by the flexibility of its structure, i. e. the capacity of the box sides to bulge as pressure is applied to the contents, it being understood that during this initial down stroke of the head the box sides are unsupported against bulging. Fig. 3 illustrates the position of the head at about the limit of its initial down stroke. As the crank 55 continues through 360° rotation, the head 48 is returned to its up position.

Cam 46 rotates into engagement with arm 76 in advance of the second down travel of the head to progressively bring the pressure plates 61, 68, and 100 against the box sides, and actuate the holders 91 to swing the cover inwardly, as will be observed by reference to the intermediate position of Fig. 4. As cam 46 continues its rotation, holders 91 bring the lid down against the crown pack and thus preposition it for engagement by the head 48 as it follows and reaches the holders in their down travel. Continuing on its down stroke, the head engages the cover and the holder flanges 92 to press the cover into closed position permitting interlocking of the wire loops 60 and 63. Throughout pressural application of the cover, the pressure plates strongly support and hold the upper box sides against bulging, and in so doing permit the cover plate to be brought down at the outside of the box ends, as previously described. It is also to be noted that by virtue of its extent above the box, plate 68 laterally supports the rear edge of the cover against displacement rearwardly from the box at the hinge. Accordingly, being thus supported at its rear edge, and confined at its side edges by the holders 91, the lid is accurately centered for proper closing against the box. Continued rotation of the cam 46 permits retraction of the pressure plates and cam 88 while elevation of the head 48 allows the holders 91 to return to their initial positions. Having been displaced from the stop 23, the lidded box then may be removed to the left from the supporting table.

In Figs. 8 to 15 of the drawings, we have illustrated a supplemental showing identical with the form illustrated in Figs. 1 to 7 inclusive, the concurrent parts carrying the same numbers, but including additional features intentionally omitted from Figs. 1 to 7 to prevent complication of the drawings. Figs. 8 to 15 show only the essential parts associated with the operation of the additional features to be subsequently described.

The added features not included in the machine as described above, are a loop straightening means 200 associated with the vertical column 13 of the machine for engaging the loops 60 of the box lid 22a; a loop straightening and pinching means 201 associated with the front pressure plate 61, engageable with the wire loops 63; and the manual tying or locking means 202 associated with the cover pressure head for locking the lid 22a in its closed position.

The loop straightening means 200 carried by the vertical column 13 of the machine includes a U-shaped frame 203 with its vertical portions 204 guided in brackets 205 attached to the column and operable for vertical movement relative thereto. The horizontal portion 206 of the frame 203 carries spaced hooks 207 for engaging the loops 60 of the box lid 22a. The hooks 207 have limited reciprocal movement in bodies 208 rotatably carried on the frame portion 206 and held in spaced set relation by locating collars 209 adjustably fixed to the portion 206. Springs 210 are arranged between heads 211 on the upper end of the hooks 207 and a washer 212 engaging the upper end of the bodies 208. The springs 210 allow limited relative movement between the hooks 207 and their guide bodies 208. A second spring 213 for each hook, yieldingly urges the hook forwardly towards the lid 22a, and is connected between the washer 212 and a lug 214 carried by one of its locating collars 209.

The several hooks 207 may be laterally adjusted on the portion 206 of the reciprocating frame 203 and locked in position by the spaced locating collars 209 where their points 215 are positioned in vertical alinement with the spaced loop 60 of the box lid 22a. Adjustable stop collars 216 are carried by the vertical portions 204 of the frame for positioning the points 215 of the hooks where they normally engage the lid 22a adjacent its upper edge as illustrated in Figs. 8 and 9.

The frame 203 is reciprocated vertically by the cover pressure head and is connected therewith by a pair of spaced cables 217, each having one end connected with the frame 203 and extending upwardly to be trained over spaced idler pulleys 218 carried at the upper end of the vertical column 13, the cables having their other ends attached to the pressure head frame 49.

The loop straightening and pinching means 201 associated with the front pressure plate 61 is carried by a pair of spaced arms 220 pivotally mounted on the supporting rod 65 for the pressure plate 61. A head 221 attached to the upper ends of the arms 220 guides a pair of oppositely reciprocable bars 222 carrying pincher plates 223 for engaging the loop 63. The pincher plates 223 are in spaced sets located in vertical alinement with the loops 63 at the front of the box 22. The bars 222 each carry one of each set of pincher plates 223 and are reciprocated in opposite directions by cams 224 located at the outer side of the head 221. The cams 224 have oppositely pitched surfaces 225 and 226 for cooperating with rollers 227 and 228 carried by the bars 222 and urged against the cam surfaces 225 and 226 by springs 234. The cams 224 are carried at the upper end of plungers 229 guided for vertical reciprocation by spaced bearing 230 mounted on the arms 220. Rollers 231 on the lower end of the plungers 229 cooperate with stationary cams 232 carried by the table 12 of the machine. A torsional spring 233 engaging the arms 64 carrying the front pressure plate 61 and the arms 220 carrying the wire straightening and pinching means 201, urges the arms together to bring the loop straightening means 201 into engagement with the loops 63 while permitting relative movement between the arms 64 and 220.

The manual tying or locking means 202 carried by the cover pressure head includes spaced loop engaging fingers 235 carried by horizontally reciprocable carriers 236 slidable in swivel heads 237 attached to the upper side of the pressure plate 48. Upwardly and forwardly projecting portions 238 of the carriers 236 are connected together by a manually engageable operating bar 239. The carriers 236 are normally held in their retracted position as illustrated in Fig. 8 by springs 240 connected between the carrier and the relatively stationary pressure plate 48.

In operation, the cover press head 49 first is brought down into direct engagement with the produce, thus compacting it into the box, all as previously described. During this stroke of the head the cables 217 connected between the head and frame 203 carrying the spaced hooks 207, produces upward movement of the frame and simultaneous engagement of the hooks with the spaced loops 60 to exert an up pull on the loops resulting in their straightening and alinement. After having compressed the produce into the box and the hooks 207 having straightened the loops 60 as illustrated in Fig. 10, the head 49 returns to its up position and the hooks 207 are released from the loops 60.

As the head starts down the second time, the cam 46 engaging the arm 76 causes the lid holders 91 to shift the lid forwardly away from the hooks 207 to the initial lid closing position illustrated in Fig. 4 to be further closed by the head plate 48. Simultaneously with the initial closing of the lid, the front pressure plate 61, the rear pressure plate 68 and the side pressure arms 101 come into engagement with the four sides of the box 22 to position and hold it in shape as the lid is closed thereon. The pressure plates 61 and 68 and the arms 101 engage the box prior to the final closing of the lid, and the wire straightening means 201 is brought into engagement with the front loops 63. The loops are pinched by the sets of plates 223 through the action of the rollers 231 engaging the cams 232 to produce vertical movement of the plungers 229 and subsequent reciprocation of the bars 222 in opposite direction through the engagement of the cam surfaces 225 and 226 with the rollers 227 and 228.

The last final closing movement of the lid by the cover pressure head brings a cam 245 carried by the head into engagement with the head 221 of the loop straightening means 201 to cause the straightening means to shift to the retracted position illustrated in Fig. 14 to permit reception of the loops 63 by the loops 60 on the lid and operation of the manual tie means 202 to lock the cover in its closed position. At this point the machine is stopped or dwells to permit the tie to be formed between the loops. The tie is formed by an outward pull on the connecting bar 239 of the means 202 causing the fingers 235 to engage the vertical loops 63 to curl them outwardly and downwardly as illustrated in Fig. 14. Upon release of the looped tying means 202, the cycle of the machine is continued and the pressure head is returned to its upper normal position as illustrated in Fig. 8 of the drawings, at which time the cam 46 has reached the position illustrated in Figs. 1 and 2 resulting in simultaneous release of the pressure plates 61 and 68 and the pressure arms 201 from the box.

Figs. 16 to 18 illustrate a modification of the invention with respect to the structure of the head or cover press assembly. The principal characteristics of the head assembly here shown are that it dispenses with the previously described frame mounted front pressure plate 61, and adapts a modified cover press head to serve the several purposes of pressing the cover on the box, displacing into the box confines produce extending beyond its forward edge, and of supporting the front side of the box against bulging during pressure application of the lid. The head further serves to mount a device for interlocking the cover-carried and box-carried wire projections or loops.

Referring to Fig. 16, the bowed head plate 48 and the supporting arms 49 correspond in structure, mounting and operation to the similarly numbered parts previously described. In the modified form, arms 49 carry a pair of depending wings 250 having outwardly deflected rear and bottom projections 251 and 252. The spacing of wings 250 corresponds to the long dimension of the box lid, and the wings serve to receive and accurately aline the box with the lid in closed position, as well as to bring the projections 60 and 63 into accurate alinement, as by causing the box-carried projections 63 to be thrust through the loops 60. The forward side of the head 48 carries the depending plates 253 spaced apart at 254, each plate having an upper vertical portion 255 and an outwardly flared bottom flange 256. As illustrated in Fig. 7, at the lower position of the head, plates 253 are brought downward so that their portions 255 engage the upper surface of the box side throughout a vertical distance sufficient to accurately aline the box edge with relation to its cover.

The wings 250 carry a pair of pivoted arms 257 interconnected by handle bar 258 and a lower angle bar 259. The latter carries a plurality of depending inwardly turned fingers 260 spaced in accordance with the spacing of the projections 60 and 63 on the box and cover, the inner pair of fingers being alined with the spaces 254. Outward swinging movement of the arms 257 is suitably resisted as by coil springs 261.

In considering the operation of the head assembly, the machine may be assumed to vertically actuate the cover plate 48 in the same manner previously described. Assume first that the parts of the machine are in the position shown by Fig. 4 in which the rear pressure plate 68 has displaced the box forwardly on its support, to a position of proper vertical alinement with the head. As the latter then moves downward, the cover is brought between wings 250 for accurate alinement with the box, and the depending flanges 253 progressively move downward against any produce overhanging the outer edge of the box, and in so doing tend to displace the produce back into the box area. Continued downward movement of the head brings the vertical portions 255 of the plates against the top edge and side of the box, displacing it inwardly to relieve any bulge and thus bring the box edge into parallelism with the front edge of the lid. With the head fully pressed down to the position of Fig. 17, projections 63 are thrust up through loops 60, as previously described. The projections and loops then are interlocked by pulling the handle bar 258 forwardly to cause fingers 260 to swing outwardly and downwardly first to engage and bend down the projections 63, and then to bend both projections 63 and 60 together down against the side of the box as illustrated in Fig. 18. Upon release of the handle bar, the parts of the projection interlocking mechanism are returned to their Fig. 17 positions. The cover thus having been secured to the box, the head then raises to permit displacement of the box from the machine and reception of the next box to be lidded.

We claim:

1. A lidder for a produce box having an initially upstanding cover hinged thereto at the rear top edge of the box, comprising a lidder structure including a frame, a box support carried by the frame and a cover press head overlying said support, said head and support being relatively vertically movable to press the cover on the box, a cover engaging member movably carried by said structure and operable independently of said head for swinging the cover downward, and means for actuating said member.

2. A lidder for a produce box having an initially upstanding cover hinged thereto at the rear top edge of the box, comprising a lidder structure including a frame, a box support carried by the frame and a cover press head overlying said support, said head and support being relatively vertically movable to press the cover on the box, a cover engaging member movably carried by said structure and positioned at one side of the box, and mechanism carried by said structure and operating in predetermined timed relation with said relative vertical movement of the head and support to actuate said member to swing said cover downward in advance of relative movement together of the support and head.

3. A lidder for a produce box having an initially upstanding cover hinged thereto at the rear top edge of the box, comprising a frame, a box support carried by the frame, a cover press head overlying said support, said head and support being relatively vertically movable to press the cover on the box, holding members engageable with the top and ends of the cover and movable beneath the head, means for actuating said holding members to swing the cover downwardly, and means for then moving the head down against the cover and holding members to press the cover on the box.

4. A lidder for a produce box having an initially upstanding cover hinged thereto at the rear top edge of the box, comprising a frame, a box support carried by the frame, a cover press head overlying said support, said head and support being relatively vertically movable to press the cover on the box, means for producing such relative movement, means engaging the rear edge of the cover to hold it against outward displacement during pressural application of the cover to the box, a downwardly movable cover engaging member carried by the frame, and mechanism operating to actuate said member to swing the cover downwardly on the box in advance of relative movement of said head and support to cover appylying position.

5. A lidder for a produce box having an initially upstanding cover hinged thereto at the rear top edge of the box, comprising a box support, a cover press head overlying said support, said head and support being relatively vertically movable to press the cover on the box, means for producing such relative movement, a member movable in predetermined timed relation with relative movement of the support and head to engage the rear edge of the cover to hold it against outward displacement during pressural application of the cover to the box, a downwardly movable cover engaging member, and mechanism operating to actuate said member to swing the cover downwardly on the box in advance of relative movement of said head and support to cover applying position.

6. A lidder for a produce box having an initially upstanding cover hinged thereto at the rear top edge of the box, the cover having depending end edge cleats adapted to overlap the top surfaces of flexible ends of the box, comprising a lidder structure including a frame, a support carried by the frame and a cover press head, said head and support being relatively vertically movable to press the cover on the box, members carried by said structure and movable into and out of positions above the transverse central portion of the support engaged by the box, in which positions the members extend parallel with and engage the transverse centrally located portions of the box ends near their tops to hold the box ends against bulging and enable said cleats to be brought down into said overlapping relation with the box ends, and means holding the cover against movement longitudinally of the box.

7. A lidder for a produce box having an initially upstanding cover hinged thereto at the rear top edge of the box, the cover having depending edge cleats adapted to overlap the top surfaces of flexible ends of the box, comprising a lidder structure including a frame, a support carried by the frame, and a cover press head, said head and support being relatively vertically movable to press the cover in the box, a pair of members movably carried by said structure in positions to extend along and in engagement with the box ends at their transverse central portions, means operating in predetermined timed relation with relative vertical movement of said support and head to move said members against said transverse central portions of the box ends to confine them against bulging and enable said cleats to be brought down into said overlapping relation with the box ends, movable cover engaging members engageable with the box ends and holding the cover against movement longitudinally of the box, and means for actuating cover engaging members to swing the cover down on the box.

8. A box lidding machine comprising a support adapted to receive a box having flexible sides and a hinged cover initially in an open upstanding position, a cover press head overlying the support, means in offset relation to the head for holding the cover in said open position, said head and support being relatively vertically movable to press a cover on the box, and means for producing said relative movement while the cover remains in said open position to cause the head to engage and press produce into the box.

9. A box lidding machine comprising a support adapted to receive a box having flexible sides and a hinged cover initially in an open upstanding position, a cover press head overlying the support, said head and support being relatively vertically movable to press a cover on the box, power means for producing said relative movement to bring the head relatively toward and away from the box in a first cycle and while the cover remains in said open position and a plurality of the box sides are unsupported against bulging to allow the head to engage and press produce into the box, means operating thereafter to engage and support said sides of the box against bulging, and means operable after release of said head from the produce to swing said cover beneath the head in advance of its cover applying position to cause the head to press the cover on the box during a successive cycle of relative movement of the support and head.

10. A machine for lidding a box having a lid hinged at one edge to one side of the box and having an opposite edge carrying a first flexible wire loop projection adapted to be interlocked with a second wire loop projection carried by a side of the box opposite its first mentioned side; said machine comprising a support for reception of the box with its cover in open position, a cover press head overlying said support, said support and head being relatively movable to press said cover on the box, mechanism operable in timed relation with the relative movement of said support and head to engage and aline said projections for interconnection, and means carried by said head for interlocking said projections when the cover is pressed on the box.

11. A box lidding machine comprising a box support, a cover press head overlying the support, said support and head being relatively vertically movable to press a cover on the box, a first pair of members including a rear member engageable with the rear side wall of the box and a movable front member engageable with the front side wall of the box, a second pair of members movable relative to said front and rear members into and out of pressural engagement with the end walls of the box, and means operable in predetermined timed relation with relative vertical movement of said support and head to move said front member and second pair of members against flexible sides and ends of the box to resist bulging thereof in advance of application of bulging pressure to said walls by closing of the cover.

12. A box lidding machine comprising a support for a box having a hinged cover carrying at its free edge a pair of spaced flexible projections to be interlocked with a pair of flexible projections carried by the box edge, a cover press head overlying the support, said support and head being relatively movable to press a cover on the box, a pressure member carried by the head and extending longitudinally thereof to engage against an extent of the box side wall at its longitudinal central portion sufficient to prevent substantial bulging thereof during pressural application of the cover to the box, and movable members beyond the ends of said pressure member operable to deflect one pair of said projections.

13. A box lidding machine comprising a support for a box having a hinged cover carrying at its free edge a pair of spaced flexible projections to be interlocked with a pair of flexible projections carried by the box edge, a cover press head overlying the support, said support and head being relatively movable to press a cover on the box, a member depending from and rigidly carried by the side of the head and extending longitudinally thereof to engage against an extent of the box side wall at its longitudinal central portion sufficient to prevent substantial bulging thereof during pressural application of the cover to the box, and movable members beyond the ends of said pressure member operable to deflect one pair of said projections.

14. A box lidding machine comprising a box support, a cover press head overlying the support, said support and head being relatively movable to press a cover on the box, and a member depending from and extending longitudinally of the side of the head at its central portion, said member having a vertically extending upper portion and an outwardly extending lower portion so that during said relative movement of the head and support said lower portion is engageable against a top edge of the front side of the box at its longitudinal center to aline said edge for engagement and confinement of the last mentioned side by said upper portion of the members.

15. A box lidding machine comprising a frame, a support carried by the frame and adapted to receive a box having flexible sides and a hinged cover initially in an open upstanding position, a cover press head overlying the support, said head and support being relatively vertically movable to press a cover on the box, power means for producing said relative movement to bring the head relatively toward and away from the box in a first cycle and while the cover remains in said open position to allow the head to engage and press produce into the box, a movable cover actuating member carried by the frame, and mechanism operating in timed relation to said power means to actuate said member to swing said cover beneath the head in advance of its cover applying position to cause the head to press the cover on the box during a successive cycle of relative movement of said support and head.

16. A box lidding machine comprising a frame, a support carried by the frame and adapted to receive a box having flexible sides and a hinged cover initially in an open upstanding position, a vertically movable cover press head overlying the support, power means for moving said head through successive down and up cycles, said machine accommodating the cover in said open position during a first of said cycles so that the head engages and presses produce into the box, a movable cover engaging member, and mechanism operating automatically and in timed relation with the cyclar relative movement of the support and head to actuate said member to move the cover beneath the head following said first cycle so that during the second cycle the head presses the cover on the box.

17. A box lidding machine comprising a frame, a support carried by the frame and adapted to receive a box having flexible sides and a hinged cover initially in an open upstanding position, a vertically movable cover press head overlying the support, power means for producing relative vertical movement of the support and head through successive down and up cycles, said machine accommodating the cover in said open position during a first of said cycles so that the head engages and presses produce into the box, a plurality of the box sides initially remaining unsupported against bulging while the produce is being so pressed into the box, movable members engageable with said initially unsupported sides of the box, means maintaining said member out of engagement with said sides of the box during said pressing of the produce into the box, mechanism operating in timed relation with said relative movement of the support and head to actuate and cause said members to engage and support said sides against bulging after disengagement of the head from the produce during said first cycle, the cover then being movable beneath the head so that during the second of said cycles the head presses the cover on the box while said box sides are supported by said members.

18. A lidder for a produce box having an initially upstanding cover hinged thereto at the rear side of the box, comprising a cover press structure including a frame, a box support carried by the frame, and a head engageable with said cover and operable to press the cover to closed position against crown packed contents of the box, members engageable with said rear side of the box and with its opposite front side to prevent bulging of said sides during pressural application of the cover to the box, mechanism for actuating said members, a cover engaging member carried by said structure and movable downwardly to swing the cover from open toward closed position, and actuating means operable in predetermined timed relation with the operating of said mechanism for actuating said cover engaging member to swing the cover beneath the head in advance of its cover pressing travel toward the box.

19. A machine for lidding a box having a lid hinged at one edge to one side of the box and having an opposite edge carrying a flexible projection adapted to be connected with an alined second flexible projection carried by a side of the box opposite its first mentioned side, said machine comprising a cover press structure including a frame and a support carried by the frame for reception of the box, a member movably carried by said structure and engageable with the cover-carried projection when in misalined position and operable to deflect it longitudinally of the cover edge relative to and into connecting alinement with said second projection, and means for actuating said member to so deflect the projection.

20. A machine for lidding a box having a lid hinged at one edge to one side of the box and having an opposite edge carrying flexible projection adapted to be connected with an alined second flexible projection carried by a side of the box opposite its first mentioned side, said machine comprising a cover press structure including a frame and a support carried by the frame for reception of the box, a member movably carried by said structure and engageable with said second projection when in misalined position and operable to deflect it longitudinally of the box edge relative to and into interconnecting alinement with said second projection, and means for actuating said member to so deflect the projection.

21. A machine for lidding a box having a lid hinged at one edge to one side of the box and having an opposite edge carrying a first flexible projection adapted to be connected with an alined second flexible projection carried by a side of the box opposite its first mentioned side, said machine comprising a cover press structure including a frame and a support carried by the frame for reception of the box, a pair of relatively movable members carried by said structure and engageable respectively with said first and second projections when in misalined positions and operable to deflect said projections longitudinally of the cover and box edges into interconnecting alinement, and means for actuating said members to so deflect the projections.

22. A machine for lidding a box having a lid hinged at one edge to one side of the box and having an opposite edge carrying a first flexible projection adapted to be connected with an alined second flexible projection carried by a side of the box opposite its first mentioned side, said machine comprising a press structure including a frame, a support carried by the frame for reception of the box with its cover in an open position, and a cover engaging head spaced from the support, said support and head being relatively movable to press said cover on the box, a pair of relatively movable members carried by said structure and engageable respectively with said projections when in misalined positions and operable to deflect the projections longitudinally of the cover and box edges into interconnecting alinement, and means for then interlocking the projections.

23. A machine for lidding a box having a lid hinged at one edge to one side of the box and having an opposite edge carrying a first flexible wire loop projection adapted to be interlocked with a second wire loop projection carried by a side of the box opposite its first mentioned side, said machine comprising a press structure including a frame, and a support carried by the frame for reception of the box with its cover in an open position, a movable member carried by said structure and positioned to enter said first loop and operating to straighten it outwardly from the cover edge into alinement with said second loop, and means for then interlocking the loops.

24. A machine for lidding a box having a lid hinged at one edge to one side of the box and having an opposite edge carrying a first flexible wire loop projection adapted to be interlocked with a second wire loop projection carried by a side of the box opposite its first mentioned side, said machine comprising a cover press structure including a frame, a support carried by the frame for reception of the box with its cover in an open position, and a cover engaging head spaced from said support, said support and head being relatively movable to press said cover on the box, a member carried by said structure and shiftable longitudinally of the box edge to engage and deflect said second loop into alinement with the first loop, and means for actuating said member.

25. A machine for lidding a box having a lid hinged at one edge to one side of the box and having an opposite edge carrying spaced first flexible wire loop projections adapted to be interlocked with second correspondingly spaced wire loop projections carried by a side of the box opposite its first mentioned side, said machine comprising a cover press structure including a frame, a support carried by the frame for reception of the box with its cover in open position, a first series of straightening elements carried by said structure and engageable with said first loop projections and operable to deflect them longitudinally of the cover edge, and a second series of straightening elements carried by said structure and movable relative to said first series and engageable with said second loop projections to deflect them longitudinally of the box edge into alinement with said first loops, and means for producing such relative movement of said first and second series of straightening elements.

26. A machine for lidding a box having a lid hinged at one edge to one side of the box and having an opposite edge carrying a series of spaced first flexible wire loop projections adapted to be interlocked with a series of correspondingly spaced second wire loop projections carried by a side of the box opposite its first mentioned side, said machine comprising a press structure including a frame, a support carried by the frame for reception of the box with its cover in an open position, and a cover press head overlying said support, said support and head being relatively movable to press said cover on the box, and mechanism operable in timed relation with the relative movement of said support and head to engage and aline said projections for interconnection, said mechanism comprising a first series of elements carried by said structure and engageable with one of said projection series, and a second series of elements carried by said structure and movable longitudinally of the cover and box edges and engageable with the second projection series to aline the loops thereof for interlocking engagement with the loops of the first projection series.

27. A machine for lidding wire bound flexible boxes, comprising a press structure including a frame, a support carried by the frame and onto which a box having a hinged cover and flexible end walls is movable, and a pressing member spaced from the support and engageable with the cover, said support and pressing member being relatively movable to press the cover on the box, power means for producing cover pressing relative movement of said member and support, a pair of members carried by said structure and movable into and out of positions above the transverse central portion of the support engaged by the box, in which positions the members extend parallel with and engage the transverse centrally located portions of said end walls of the box to resist center bulging during pressural application of the cover to the box and thereby maintain substantial parallelism of the cover and box ends, and mechanism carried by said structure and connected to said pair of members and operating in predetermined timed relation with the operation of said power means to so engage said pair of members with the box ends in advance of the application of substantial bulging pressure thereto by closing of the cover.

28. A machine for lidding wire bound flexible boxes, comprising a press structure including a frame, a support carried by the frame and onto which a box having a hinged cover and flexible end walls is movable, and a pressing member spaced from the support and engageable with the cover, said support and member being relatively vertically movable to press the cover on the box, power means for producing cover pressing relative movement of said member and support, a pair of movable members movably carried by said structure and engageable with the transverse centrally located portions of said end walls of the box to resist center bulging during pressural application of the cover to the box and thereby maintain substantial parallelism of the cover and box ends, means for holding the cover against movement longitudinally of its hinge and outwardly from the box at the hinge, and mechanism carried by said structure and connected to said pair of members and operating in predetermined timed relation with said power means and the relative movement of said support and head pressing member to so engage said pair of members with the box ends in advance of the application of bulging pressure thereto by the closing of the cover.

29. A machine for lidding wire bound flexible boxes, comprising a press structure including a frame, a support carried by the frame and onto which a box having a hinged cover and flexible end walls is movable endwise, and a pressing member overlying the support and engageable with the cover, said support and member being relatively vertically movable to press the cover on the box, power means for producing cover pressing relative movement of said member and support, a pair of members movably carried by said structure normally out of the path of a box advancing onto and leaving said support and movable into and out of positions above the transverse central portion of the support engaged by the box, in which position the members extend parallel with and engage the transverse central portions of the box ends, and mechanism carried by said structure and operating to actuate said pair of members in predetermined timed relation with the relative vertical movement of said support and pressing member to cause said pair of members to engage the transverse centrally located portions of said end walls of the box to resist center bulging thereof during pressural application of the cover to the box and thereby maintain substantial parallelism of the cover and box ends.

30. A machine for lidding wire bound flexible boxes, comprising a press structure including a frame, a support carried by the frame and onto which a box having a hinged cover and flexible end walls is movable endwise, and a cover press head overlying the support, said support and head being relatively vertically movable to press a cover on the box, a first pair of members movably carried by said structure and engageable with said end walls of the box along transverse centrally located extents thereof sufficient to prevent center bulging, said members being movable into and out of the path of a box advancing onto and leaving said support, and a second pair of members carried by said structure and relatively movable independent of said first pair of members and engageable with the box sides to prevent bulging thereof, and mechanism operable in predetermined timed relation with the relative vertical movement of said support and head to move said first pair of members into and out of engagement with said end walls of the box.

31. A machine for lidding a crown-packed wire bound box having a hinged cover and flexible sides, comprising a frame structure including a support for the box, a cover pressing member spaced from the support, said support and member being relatively movable to press the cover on the box, power means for so relatively moving the member and support, members movably carried by said frame and relatively pivotally movable in different paths for engagement with both side and end walls of the box at their respective longitudinal central portions to resist bulging thereof during pressural application of the cover to the box, and mechanism connected to said members and operating in timed relation with the relative movement of the pressing member and support for so engaging said members with said box walls in advance of the application of substantial bulging pressure thereto by the cover.

32. A box lidding machine comprising a press structure including a frame, a support for a flexible wall box having a hinged cover, and a cover pressing member overlying the support, said support and member being relatively movable to press the cover on the box, power means for so relatively moving the member and support, a first pair of relatively movable members carried by said structure and engageable with the sides of the box, and a second pair of members carried by said structure and movable relative to said first pair and engageable with the ends of the box at the transverse central portion thereof, and power means connected to said pairs of members and operable in predetermined timed relation with the relative vertical movement of said support and pressing member to effect tight engagement of said first and second pairs of members against the box sides and ends to resist bulging thereof during pressural application of the cover to the box.

33. A lidder for a produce box having an initially upstanding cover hinged thereto at the rear top edge of the box, comprising a frame, a box support carried by the frame, a cover press member above the support, said member and support being relatively vertically movable to press the cover on the box, means carried by the frame in offset relation to the cover press member and supported independently of said member for holding the cover against movement longitudinally of said edge, and power means for producing relative vertical movement of said member and support while the cover is held against such movement.

34. A lidder for a produce box having an initially upstanding cover hinged thereto at the rear top edge of the box, comprising a frame, a box support carried by the frame, a cover press member above the support, said member and support being relatively vertically movable to press the cover on the box, a pair of movable holding elements carried by the frame to engage opposite ends of the cover and supported independently of said member to hold the cover against movement longitudinally of the box, and power means for producing relative vertical movement of said member and support while the cover is held against such movement.

LELAND H. PLATT.
LELAND H. PLATT, Jr.
JOHN D. PLATT.

REFERENCES CITED

The following references are of record in the file of this patent:

UNITED STATES PATENTS

| Number | Name | Date |
| --- | --- | --- |
| 965,738 | Paton | July 26, 1910 |
| 1,053,258 | Welter | Feb. 18, 1913 |
| 1,585,858 | Hiatt | May 25, 1926 |
| 1,747,599 | Poynter | Feb. 18, 1930 |
| 1,829,230 | Meer | Oct. 27, 1931 |
| 1,976,033 | Platt | Oct. 9, 1934 |
| 2,015,455 | Meer | Sept. 24, 1935 |
| 2,063,124 | Rosenmund | Dec. 8, 1936 |
| 2,114,724 | Paxton | Apr. 19, 1938 |
| 2,121,821 | Paxton | June 28, 1938 |